United States Patent [19]
Songer

[11] Patent Number: 5,844,619
[45] Date of Patent: Dec. 1, 1998

[54] FLICKER ELIMINATION SYSTEM

[75] Inventor: Jimmie D. Songer, Burleson, Tex.

[73] Assignee: Magma, Inc., Fort Worth, Tex.

[21] Appl. No.: 706,415

[22] Filed: Aug. 30, 1996

Related U.S. Application Data

[63] Continuation-in-part of Ser. No. 667,550, Jun. 21, 1996.
[51] Int. Cl.$^6$ .............................. H04N 7/01; H04N 11/20
[52] U.S. Cl. ...................... 348/447; 348/448; 348/457; 348/443
[58] Field of Search ..................... 348/447, 448, 348/457, 458, 459, 443; H04N 7/01, 11/20

[56] References Cited

U.S. PATENT DOCUMENTS

| | | | |
|---|---|---|---|
| 4,322,750 | 3/1982 | Lord et al. ............................... | 358/140 |
| 4,701,793 | 10/1987 | den Hollander et al. .............. | 358/140 |
| 4,851,908 | 7/1989 | Welles et al. ........................... | 348/447 |
| 5,469,217 | 11/1995 | Ibental et al. .......................... | 348/447 |
| 5,627,598 | 5/1997 | Tsuchida ................................. | 348/550 |

*Primary Examiner*—Michael Lee
*Assistant Examiner*—Vivek Srivastavia
*Attorney, Agent, or Firm*—David Newman Chartered

[57] ABSTRACT

A system and method for eliminating flicker in an interlaced video-display image using an input-video processor, a feature-video processor, a frame buffer, an RGB-output processor, an output-video processor, a control processor, and a synchronized-clock doubler. An input video signal is processed as processed component video information and written to a video memory at a horizontal-scan rate and a vertical-scan rate. Based on the input video signal, a vertical-scan synchronization pulse and a horizontal-scan synchronization pulse are generated and then harmonically doubled. The processed component video information is read from the video memory, responsive to the harmonically doubled synchronization pulses, at a harmonically doubled horizontal-scan rate and a harmonically doubled vertical-scan rate, reading in an interlaced format, with each frame being contiguously read twice in a proper odd-even order as when normally read to generate four fields of video information per frame which may be interlaced. The result is a video display image having improved visual characteristics which is harmonic to any one of NTSC, PAL and SECAM broadcast standards.

17 Claims, 8 Drawing Sheets

5,844,619

FLICKER ELIMINATION SYSTEM

REFERENCE TO RELATED APPLICATIONS

This patent stems from a continuation-in-part application of U.S. patent application Ser. No. 08/667,550, filed Jun. 21, 1996, entitled IMAGE PROCESSOR SYSTEM. The benefit of the earlier filing date of the parent patent applications is claimed for common subject matter pursuant to 35 U.S.C. § 120.

BACKGROUND OF THE INVENTION

This invention relates to an apparatus and a method for eliminating flicker in an interlace-scanned video display image.

DESCRIPTION OF THE RELEVANT ART

Since the development of high-definition television (HDTV), considerable effort has been directed to improving the display images of NTSC and PAL broadcast standards within the constraints of their bandwidth allowances. As the displayed image grows in size, brightness, and resolution in both direct-view television and video projection, the viewing public is becoming more aware of the quality criteria that determine high definition and the defects of the "old standards." The interest generated by home cinema has created a quest for quality video similar to the interest in quality audio brought about by the high-definition revolution in sound recording and reproduction.

As was true when the first television standards were promulgated over fifty years ago establishing the NTSC monochrome standard, motion picture quality has been the almost unreachable goal. It was originally hoped that broadcast standards could match 16 mm film, and later, that HDTV could match 35 mm film.

Under the present broadcast system, film has greater resolution than video because a limited bandwidth restricts video resolution. Under ideal conditions the perceived sharpness of video can almost equal film, especially with the relatively new satellite-to-dish digital component service.

Often the difference in viewing environments between motion pictures and video is not considered in comparing the displays of two media. The illumination of the retina of the human eye is determined by the image brightness which partly controls the aperture size of the pupil. The pupil, however, reacts to the brightness of the area around the image, what is termed the "surround brightness," as well as that of the image itself. This surround brightness is very low in a dark motion-picture theater, so the pupil aperture becomes relatively large and the retinal illumination is high in relation to the screen brightness.

In a typical home environment for viewing television, the surround brightness is higher, the pupil aperture is smaller, and the retinal illumination is lower in relation to the image brightness. As result, the television image brightness can be greater without perceptible flicker than a similar image in a motion-picture theater environment.

One problem common to both motion pictures and video is lateral motion distortion created by the temporal difference of exposures. While this invention does not attempt to solve this problem, the inherent lateral motion distortion, apparent in the present invention, is about 50% of that displayed in motion pictures.

NTSC and PAL, NHK's HDTV, and three of the four proposed ATV standards depend on an interlace-scan system for capturing and displaying an image, wherein a frame of video, equivalent to a motion picture frame, consists of two interlaced fields, the two fields being the result of two alternate scans to capture first the even lines, and then the odd lines. The interlace-scan system, which replaced the original progressive-scan system, was developed primarily to reduce bandwidth, but also to minimize flicker.

Interlace scanning allows the frame rate and the bandwidth of a video signal to be reduced by half the original values. Like most compromises, there are disadvantages as well as advantages.

In an interlace-scan system, the field rate, which is one half of the frame rate, determines whether or not flicker is perceived by a viewer. In the NTSC standard, the nominal field rate is 60 Hz, which is a rate bordering on a speed at which flicker will be perceived by the human visual system, depending on the brightness of the image. At the PAL standard's field rate of 50 Hz, flicker is perceived and is a constant, annoying problem.

Small-area flicker or half-line flicker is determined by the frame rate and occurs within the 25-Hz to 30-Hz range of the frame rates of NTSC and PAL. Edge flicker is a phenomenon of four-field color interlace and occurs at half the frame rate.

Persistence of vision in the human visual system is the retention of a series of light images appearing in rapid succession, and of a short, temporal duration, such that they seem to be in fluid, continuous motion. While the range of persistence varies from one individual to the next and is incident to the brightness of the image, on the average the duration ranges between $\frac{1}{24}$ second and $\frac{1}{30}$ second with an absolute limit of $\frac{1}{70}$ second.

The obvious, but oversimplified, solution to flicker and the other interlace-related flickers is to increase the field rate. This requires converting a signal at a receiver, assuming that the transmission bandwidth is fixed, and having a display medium capable of displaying the image at an increased field rate. However, as is well known in the art, the field rate is inexorably interrelated to horizontal resolution and other aspect and timing functions.

A second solution, and one readily achievable utilizing a video projection system, is to revert to the progressively or sequentially scanned image, i.e., increase the horizontal-scan rate to scan full-frame standard images, avoiding some the problems of interlace scanning. This eliminates small-area flicker and, because the horizontal line structure has doubled, improves the raster by reducing the visibility of the line structure. While this works ideally by full-frame scanning at the camera, such an option is not presently available within the NTSC, PAL, or NHK standards, nor is it applicable to the installed base of television receivers.

In the process of writing the input signals at the standard rates and reading the signals at double those rates, problems occur, especially in the presence of motion. Many schemes are known in the art for solving these problems, including line-to-line interpolation, intra-field interpolation, inter-field interpolation, pixel averaging, and motion detection based on the degree of motion from one frame to the next. The more complicated the solution, the greater the number of incidental problems that seem to arise. Nevertheless, most solutions to motion artifacts degrade the images depicting motion and soften the images when the motion stops.

A long-felt need exists for a simple, inexpensive solution that lends itself to present and future embodiments of the display arts for an artifact-free image with the stability of a progressively scanned image and the high resolution of PAL or NTSC.

SUMMARY OF THE INVENTION

To simplify the explanation of this invention, reference is made only to NTSC standards, but the features of this invention apply equally well to PAL and should be considered inclusive of PAL and other standards.

It is an object of the invention to provide means and method for reducing the nominal field period of the output signal from 1/60 second to 1/120 second to eliminate flicker, half-line flicker, and 15-Hz edge flicker; and for increasing the nominal horizontal-scan rate from 15.750 kHz to 31.500 kHz while maintaining a vertical serrate interlace to eliminate other television artifacts such as dot crawl error, cross luminance, and cross modulation error.

Another object of the invention is to reduce strobing effects, both horizontal and vertical, of motion-picture film-to-video conversions by processing the signals from field-to-field.

A further object of the invention is to increase the visual resolution of a video signal by not sacrificing any picture information but instead by rendering any potentially objectionable picture information imperceptible to the human visual system.

According to the present invention, as embodied and broadly described herein, a flicker elimination system is provided comprising digital processing means including an input-video processor, a feature-video processor, a frame buffer, an RGB-output processor, an output-video processor, a control processor, and a vertical-and-horizontal synchronized-clock doubler.

An initial-video processor may be connected to the input video processor to provide an optimized signal structure of the input video signal and is particularly beneficial if the input video signal were a composite video signal. The initial-video processor compensates for accumulated phase-and-gain errors encountered during transmission of the video signal over a communications channel. The initial-video processor normalizes distorted-input signals by correcting for chrominance-group delays, luminance-group delays, and differential phase-and-gain incurred during the recording and transmission of television signals. In separating a video signal into a luminance component and a chrominance component, the initial-video processor can skew the luminance component and the chrominance component, referenced one to the other, both in time and amplitude, to correct for delay and distortion incurred in transmission.

The digital-processing means reshapes and reprocesses a composite video signal to conform to NTSC, PAL or other selected broadcast standard with time-base correction.

The input-video processor converts the composite video signal into digital component-signal information.

The feature-video processor processes the digital component-signal information to contour the video information, reduce noise, and bandpass-equalize the video information into processed component video information.

The vertical-and-horizontal synchronized-clock doubler doubles the vertical scan-rate and the horizontal scan-rate to generate doubled synchronization pulses. The doubled synchronization pulses are input to the frame buffer and the output-video processor. To complete the loop, a synchronization pulse from the output-video processor feeds back into the vertical-and-horizontal synchronized-clock doubler to synchronize the memory-read information for the output-video processor to decode.

The frame buffer re-establishes broadcast timing standards such as NTSC, PAL or SECAM in the processed-component video information to generate time-base corrected digital information. The frame buffer writes processed component video information at the standard vertical-scan rate and the standard horizontal-scan rate but reads the processed component video information at double the vertical-scan rate and double the horizontal-scan rate, responsive to the doubled synchronization pulses from the vertical-and-horizontal synchronized-clock doubler, to generate duplicate sets of 119.88/31,468 Hz video information.

The RGB-output processor converts the time-base corrected digital information to RGB outputs and provides digital RGB signals to the output-video processor and analog RGB signals as direct output. The RGB-output processor converts the 119.88/31,468 Hz video information to RGB outputs, providing 119.88/31,468 Hz digital signals to the output-video processor and 119.88/31,468 Hz analog RGB signals as direct output.

The output-video processor converts the 119.88/31,468 Hz digital signals into an analog video-signal format such as composite or component. The output-video processor also produces a synchronization pulse that is fed back into the vertical-and-horizontal synchronized-clock doubler to synchronize the memory-read information for the output-video processor to decode.

The control processor provides input to the input-video processor, the feature-video processor, and the output-video processor, including vertical-scan and horizontal-scan synchronization pulses to the frame buffer and the output-video processor. The control processor transmits code information as input by a user operating controls on a front panel or from a software-controlled external computer to enable the digital processor to enhance the output of the initial-video processor. In the absence of front-panel controls or computer information, the control processor contains default parameters stored in a hard-coded control-processor memory for use by the input-video processor, the feature-video processor, and the output-video processor.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
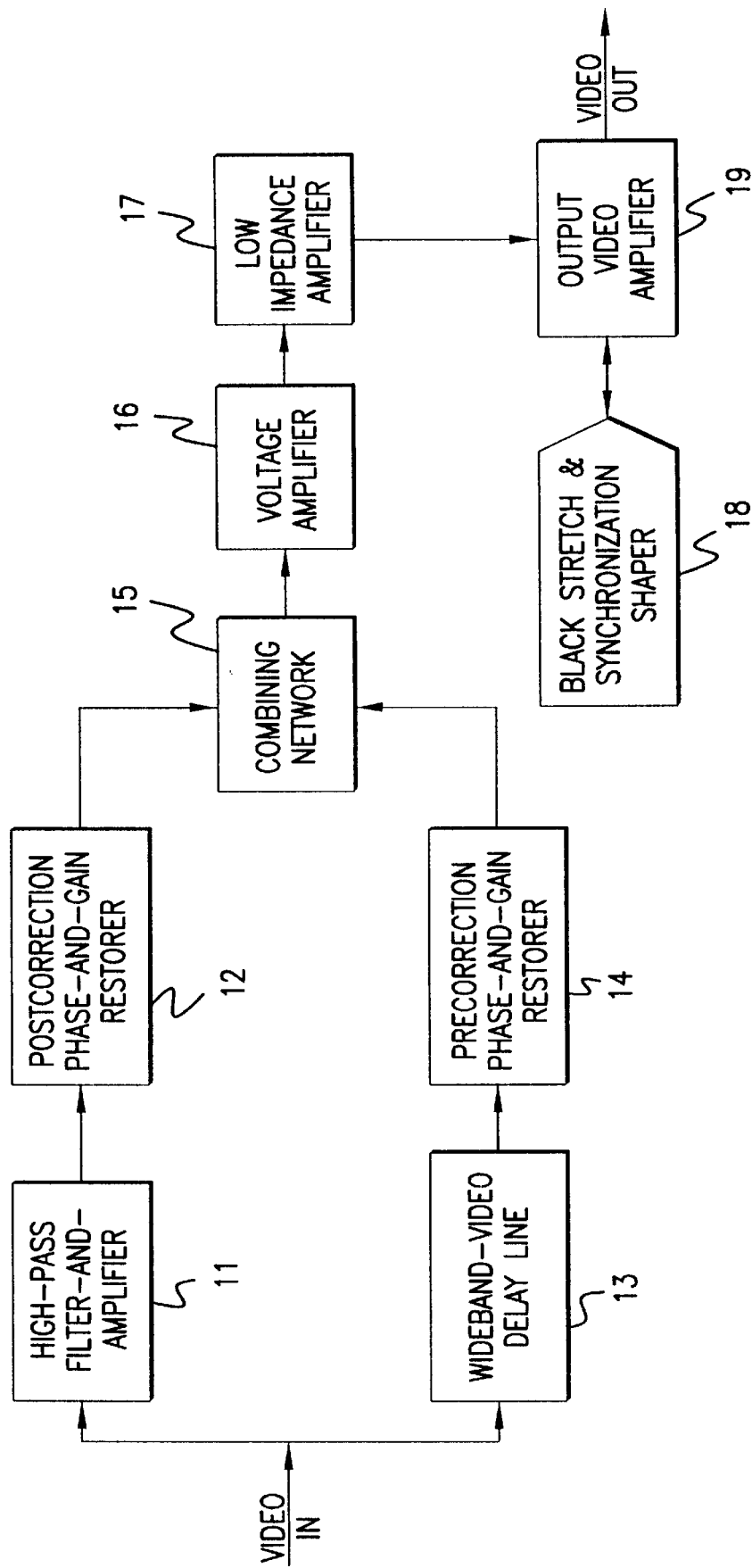
FIG. 1 shows a block diagram of the initial-video processor.

Reference now is made in detail to the present preferred embodiments of the invention, examples of which are illustrated in the accompanying drawings.

The present invention broadly provides a novel system and method for eliminating flicker, half-line flicker, and 15-Hz edge flicker in the display of a video image while maintaining full input resolution rendering an interlaced display with increased brightness, especially on a multi-sync display. The present invention also eliminates dot crawl error and cross modulation error.

The flicker-elimination system may be embodied in discrete electronic components, as an integrated circuit, as a digital-signal processor, as an application-specific integrated circuit, or as any other equivalent circuit providing the same means and performing the same functions as described herein. Using the teachings of the present invention, equivalent circuits and embodiments would be known to those skilled in the art. As used herein, "flicker-elimination" and related descriptors refer to the removal of that component of flicker that is otherwise perceptible to the human visual system. Any flicker that might remain is insignificant as it is imperceptible to the human eye during normal viewing of a video image.

According to the present invention, the nominal vertical-scan rate is doubled from 60 Hz to 120 Hz to eliminate flicker, half-line flicker, and 15-Hz edge flicker. Flicker is eliminated because the 120-Hz rate resulting from doubling is considerably above the 70-Hz threshold at which the human visual system perceives flicker of the brightest objects. Doubling the field rate likewise doubles the frame rate, eliminating half-line flicker and 15-Hz edge flicker.

Doubling the horizontal-scan rate allows the field information to be read contiguously, line-for-line, providing true picture information without any need to create pseudo-information from interpolation. With the use of the initial-video processor, all of the original picture information is available, resulting in improved resolution not possible with the prior art systems that modify picture information based on some subpart of the total original information. Rather than using harsh filters to eliminate offensive picture information, the present invention retains the picture information but renders objectionable pixels imperceptible to the human visual system.

The true picture information on a field-to-field basis available with the present invention supports field-alternate stereoscopic information without flicker by increasing the perceptual field rate from 59.94 Hz to 119.88 Hz. Support of such field-alternate stereoscopic video is not possible with the prior art systems due to the prior art's reliance on progressive scan as well as interpolation and related modification practices.

Doubling both the vertical-scan rate and the horizontal-scan rate also eliminates dot crawl error and cross modulation error. By doubling the subcarrier, the subcarrier becomes in-phase on a field-by-field basis so as to eliminate dot crawl error without the use of harsh filters that destroy picture information.

The flicker elimination system of the present invention is upward compatible from a standard NTSC or PAL production to the high vertical resolution of a 1050-line raster. The system is downward compatible for post-production in standard format, maintaining the increased vertical resolution within the standard format. After transmission, the present system is upward compatible with the same vertical resolution as was transmitted.

Most television images suffer from signal distortion that is a result of transmission- or transduction-caused changes in the waveform. These problems are addressed and a solution presented by U.S. Pat. No. 5,486,874, METHOD AND APPARATUS FOR IMPROVING TRANSMITTED VIDEO SIGNAL STRUCTURE, which is hereby incorporated herein by reference.

The flicker elimination system of the present invention has a video input and several video outputs, with a video signal being applied to the input, and a 119.88/31,468 Hz output signal issuing from the output. The video signal applied at the input of the flicker elimination system is adjusted by an initial video processor, if necessary, for accumulated phase-and-gain errors encountered during transmission over a communication channel or replayed by a recording/playback device. The accumulated phase-and-gain errors may be due to bandwidth effects as the video signal, modulating a radio-frequency (RF) carrier signal, passes through a cable or transmission line, RF circuitry of a transmitter, or circuitry in the front end of a receiver. Typically, a cable, a transmission line, or a front end of a receiver has a low-pass frequency characteristic which tends to limit the amount of the video signal being passed therethrough.

In the preferred embodiment, the flicker elimination system broadly comprises the initial video processor and digital processing means. The digital processing means includes an input-video processor, a feature-video processor, a frame buffer, an RGB-output processor, a control processor, and a vertical-and-horizontal synchronized-clock doubler. The flicker elimination system may also be employed without the initial video processor as the initial video processor is not necessary to eliminate flicker in accordance with the present invention as herein described. However, the combination of the initial video processor with the digital processor, as herein described, produces the highest quality image in terms of resolution and picture quality and is therefore preferred.

The initial video processor is coupled between the input and the input-video processor. The feature-video processor is coupled between the input-video processor and the frame buffer. The RGB-output processor is coupled to the frame buffer and to the output-video processor. The output-video processor is coupled to the RGB-output processor, the video output, and the vertical-and-horizontal synchronized-clock doubler. The control processor is coupled to the input-video processor, the feature video processor, the output-video processor and, through the vertical-and-horizontal synchronized-clock doubler, to the frame buffer and the output-video processor. These elements are discussed in turn, under respective headings.

Initial-Video Processor

The initial-video processor, when used in conjunction with the digital processor as part of the flicker elimination system of the present invention, normalizes distorted-input signals by correcting for chrominance-group delays, luminance-group delays, and differential phase-and-gain errors incurred in recording and transmitting television signals. The initial-video processor is fully described in U.S. Pat. No. 5,486,874, which is incorporated herein by reference.

The initial-video processor includes high-pass filter-and-amplifier means, postcorrection phase-and-gain restorer means, delay means, precorrection phase-and-gain restorer means, and combiner means. The high-pass filter-and-amplifier means is coupled between the input of the image-processor system, and postcorrection phase-and-gain restorer means. The delay means is coupled between the input of the image-processor system and the precorrection phase-and-gain restorer means. The postcorrection phase-and-gain restorer means and the precorrection phase-and-gain restorer means are coupled to combiner means.

The high-pass filter-and-amplifier means is for filtering a video signal. The high-pass filter-and-amplifier means has a bandwidth characteristic which preferably is inverse to the low-pass characteristic encountered during transmission of the video signal over the communications channel, or during recording and playback of the video signal in a video recorder. As used herein, the low-pass characteristic includes those effects encountered through the transmission medium, such as cable, transmission lines, and other types of channels, and the input circuit of the receiver, or equivalent effects in a video recorder. Ideally, the high-pass filter-and-amplifier means has an amplitude-versus-frequency response which is a reverse curve of the effects encountered by the video signal. The high-pass filter-and-amplifier means pre-equalizes the video signal in an inversely proportional mode.

The high-pass filter-and-amplifier means inverts the filtered video signal. The high-pass filter-and-amplifier means typically phase-shifts the filtered video signal by 180 degrees. The output of the high-pass filter-and-amplifier means is denoted herein as an inverted-filtered video signal.

The postcorrection phase-and-gain restorer means adjusts the lost gains and prephases the delayed-group information of the inverted-filtered video signal to the restored-signal level. The output signal from the postcorrection phase-and-gain restorer means is denoted herein as a restored video signal.

The delay means delays the video signal from the input by an odd-integer multiple of a half-cycle, or more, at the subcarrier frequency to match chroma-path delays. Preferably, the delay means delays the video signal by at least a half-cycle at the subcarrier frequency. The output of the delay means is denoted herein as a delayed video signal.

The precorrection phase-and-gain restorer means adjusts the delayed video signal to the restored-signal level. The output of the precorrection phase-and-gain restorer means is a restored-delayed video signal. By having the inverted-filtered video signal and the delayed video signal amplified to the restored-signal level, compensation is more easily effected at the combiner means.

The combiner means combines the restored-video signal and the restored-delayed-video signal to generate a composite-video signal. The composite-video signal includes the effects of the restored-video signal and the restored-delayed video signal.

In the exemplary arrangement of the initial-video processor shown in FIG. 1, the high-pass filter-and-amplifier means is embodied as a high-pass filter-and-amplifier 11, the postcorrection phase-and-gain restorer means is embodied as a postcorrection phase-and-gain restorer 12, the delay means is embodied as a wideband-video delay line 13, the precorrection phase-and-gain restorer means is embodied as a precorrection phase-and-gain restorer 14, and the combiner means is embodied as a combining network 15. The precorrection phase-and-gain restorer means may also be embodied as a precorrection comb-equalizer restorer or as an amplifier having a gain of one for buffering the delayed video signal.

The high-pass filter-and-amplifier 11 is coupled between the video input and the postcorrection phase-and-gain restorer 12. The wideband-video delay line 13 is coupled between the video input and the precorrection phase-and-gain restorer 14. The combining network 15 is coupled to the postcorrection phase-and-gain restorer 12 and to the precorrection phase-and-gain restorer 14.

The circuitry of the initial-video processor may further include a voltage amplifier 16 coupled to the output of the combining network 15, and low-impedance amplifier 17 coupled to the output of the voltage amplifier 16. Additionally, a black-stretch and synchronization shaper 18 may be coupled for controlling an output-video amplifier 19. The output-video amplifier 19 is coupled to the low-impedance amplifier 17 and to the video output.

The combining network 15 outputs a composite video signal. The voltage amplifier 16 amplifies the composite video signal, and the low-impedance amplifier 17 matches an impedance output of the voltage amplifier 16 to the output-video amplifier 19. The output-video amplifier 19 outputs the composite video signal.

Figure 2:
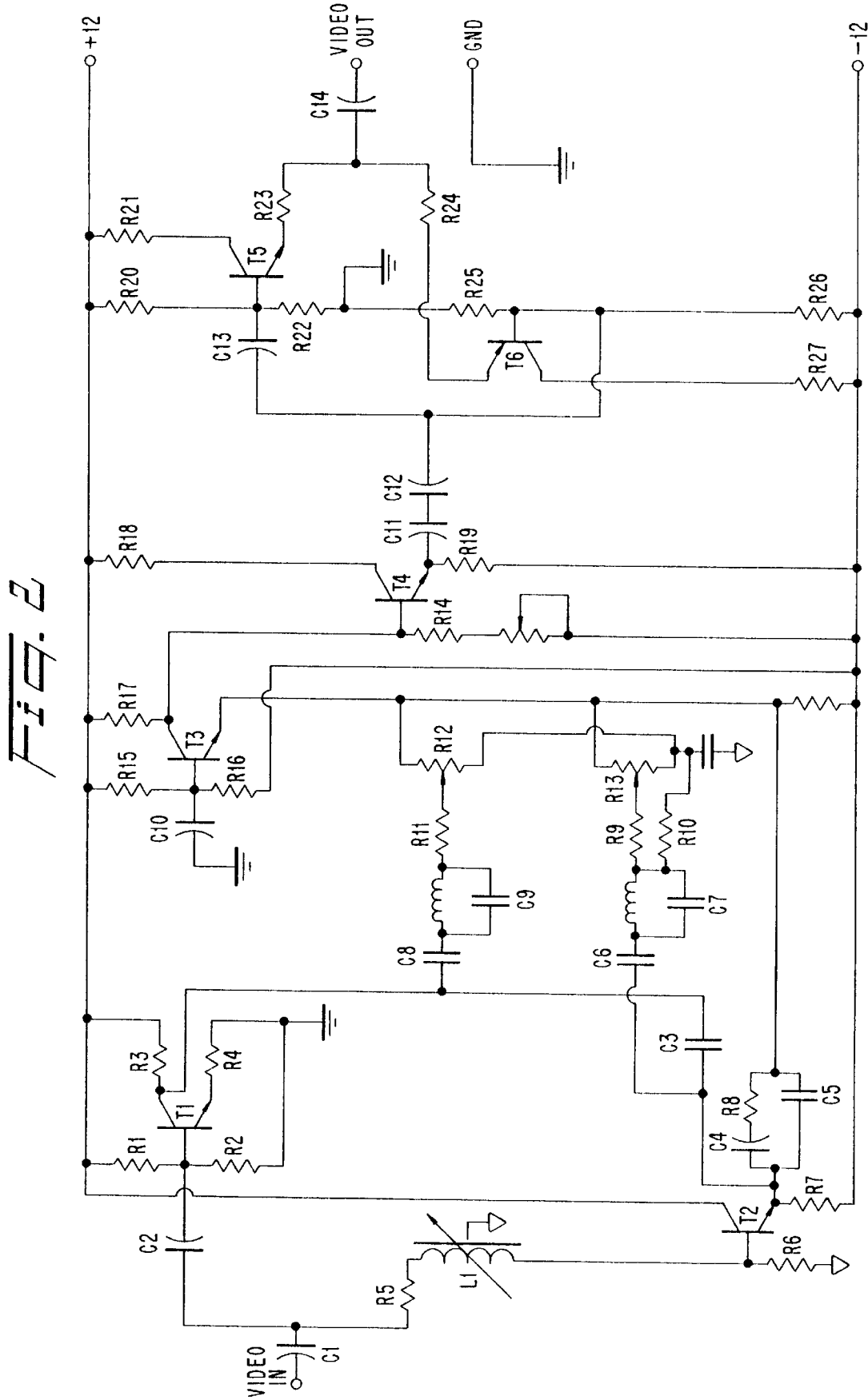
FIG. 2 is a circuit diagram of the initial-video processor of FIG. 1.

The high-pass filter-and-amplifier 11 has a bandwidth characteristic inverse to a low-pass characteristic encountered during transmission over the communications channel or during recording and playback in a recording device. Referring to FIG. 2, the high-pass filter-and-amplifier 11 may be embodied as capacitor C2 and transistor T1. For an NTSC signal, the capacitor C2 might be a fifty-picofarad capacitor. The high-pass filter-and-amplifier 11 typically has a reactance which decreases 6 dB per octave. The transistor T1 inverts the high-pass filtered video signal from the capacitor C2.

As shown in FIG. 2, a class-A amplifier working in a linear part of a characteristic curve may serve as part of the high-pass filter-and-amplifier 11. The high-pass filter-and-amplifier 11 includes transistor T1, with biasing resistors R1 and R2. Additionally, collector resistor R3 and emitter resistor R4 serve to bias the transistor T1 into the linear part of its characteristic curve.

The postcorrection phase-and-gain restorer 12 restores a signal level of the inverted-filtered video signal. The output of the postcorrection phase-and-gain restorer 12 is the restored video signal. The postcorrection phase-and-gain restorer 12 may be embodied as a resistor R12, which can adjust the signal level of the inverted-filtered video signal.

The wideband-video delay line 13 delays the video signal by an odd-integer multiple of a half-cycle, or more, at the subcarrier frequency. Preferably, the wideband-video delay line 13 delays the video signal by a half-cycle, or more, at the subcarrier frequency. As shown in FIG. 2, the wideband-video delay line 13 is embodied as delay line L1 coupled through resistor R5 and coupling capacitor C1 to the input.

A buffer circuit may buffer the delayed video signal from the output of the wideband-video delay line 13. As shown in FIG. 2, the buffer may be embodied as a transistor T2 coupled to base resistor R6, and emitter resistor R7. Transistor T2 is shown as an emitter-follower circuit, having a gain of approximately one.

The precorrection phase-and-gain restorer 14 restores a signal level of the delayed video signal to the restored-signal level. In FIG. 2, the precorrection phase-and-gain restorer 14 is embodied as resistor R13, which adjusts the signal level of the delayed video signal.

The combining network 15 combines the restored video signal and the delayed video signal. The output of the combining network 15 is the composite video signal. The combining network 15 is shown in FIG. 2 as resistor R11, R12, R9, R13, coupled to the emitter of transistor T3. Coupling capacitor C8 couples the CES postcorrection phase-and-gain restorer to the output of transistor T1, and the capacitor C6 couples the precorrection phase-and-gain restorer to transistor T2. Inductor L2 and capacitor C9 filter the restored video signal. Inductor L3 and capacitor C7 filter the delayed video signal.

The voltage amplifier 16 is shown as transistor T3. Transistor T3 has biasing resistors R15, R16, and collector resistor R17.

The low-impedance amplifier 17 is shown as transistor T4 with its base connected to the collector of transistor T3. Transistor T4 is an emitter-follower circuit, and serves as a low-impedance amplifier.

Figure 3:
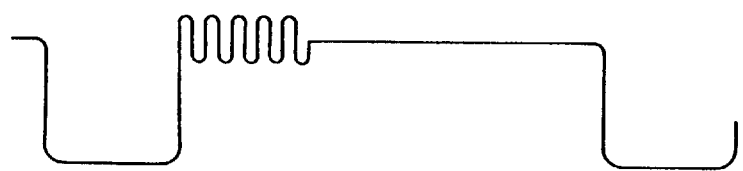
FIG. 3 is a drawing of a corrupted waveform.

As illustratively shown in FIG. 1, a NTSC video signal is received by the initial-video processor from any source and the video input passes to a high-pass filter-and-amplifier 11, while simultaneously being diverted to a wideband-video delay line 13. A corrupted video signal is shown in FIG. 3.

The high-pass filter-and-amplifier 11 filters the video frequency with a bandwidth characteristic inverse to a low-pass characteristic encountered by the video signal during its transmission or recording playback. The filtered video signal also is amplified and inverted. Postcorrection phase-and-gain restorer 12 restores a signal level to the inverted-filtered video signal. The output of the postcorrection phase-and-gain restorer 12 is the restored video signal.

The high-pass filter-and-amplifier 11 samples the high-frequency components of the video input and inverts the high-frequency components 180° out of phase, while amplifying them. Simultaneously, the identical video input is passed through a variable, wideband-video delay line 13 adjusted to the additive-inverted amplifier-signal output, delaying the entire video signal. The video signal is delayed by a half-cycle, or more, of a subcarrier frequency.

Both signals are then fed, respectively, to a postcorrection phase-and-gain restorer 12 and to a precorrection phase-and-gain restorer 14, both of which are adjusted to correct the leading and lagging edges of the high-frequency components. Using a portion of the shape of the standard synchronization tip of the original video signal as a reference, postcorrection phase-and-gain restorer 12 and precorrection phase-and-gain restorer 14 drive the combining network 15 to adjust the signal from the high-pass filter-and-amplifier 11 for composite symmetry, and adjust the signal from the wideband-video delay line 13 to correct the tilt of the low-frequency components. Thus, the non-delayed signal pre-phases the delayed signal, forming a corrected-composite signal.

The information in the delay line is adjusted to delay the composite information by one-half cycle, or more, of 3.579545 MHz for NTSC systems, so that when the wideband inverted-amplified information is added back to the composite-delayed information, the information in the wideband inverted-amplified signal is in phase, i.e., additive, with the 3.579545 MHz components of the composite-delayed information.

Figure 4:
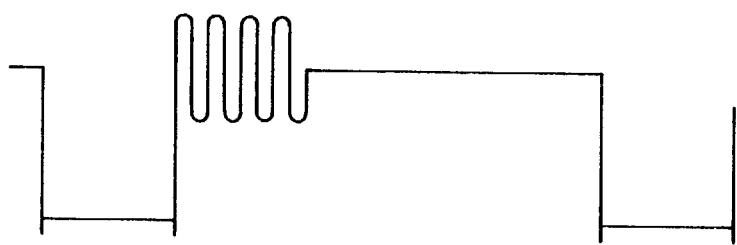
FIG. 4 is a drawing of a corrected waveform.

The combining network 15 combines the restored video signal from the postcorrection phase-and-gain restorer 12 and the delayed video signal from the precorrection phase-and-gain restorer 14, to generate the composite video signal. The composite video signal has a corrected waveform as shown in FIG. 4.

The corrected-composite video signal is then passed through a voltage amplifier 16 to restore the video amplitude of the composite-video information, then passed through a low-impedance amplifier 17 to maintain the integrity of the correction, then to a push-pull low-impedance output-video amplifier 19 which evaluates the signal and interacts with a black-stretch and synchronization shaper 18 which adds back amplitude to the synchronization tip and gamma corrects the video information in the black areas for restored video output.

The voltage amplifier 16 amplifies the composite video signal from the combining network 15. The low-impedance amplifier 17 matches impedances of the amplified-composite video signal from the voltage amplifier 16. The output-video amplifier 19 further amplifies the signal from the low-impedance amplifier 17.

For further automation and to effect real-time compensation for response time and group delays, a white signal may be used. A full-white signal of fixed duration is inserted at a line position of the vertical-blanking interval. This white signal has a known duration, a known horizontal dot-clock position and a known vertical-line position. A time measurement is started at the precise line-and-dot-clock position defined. Four time measurements are made based on the white signal.

The first measurement, start time, begins at the dot-clock position and runs to the point that the leading edge of the white signal crosses a fixed-reference point at 10% of full scale of the transition level. The second measurement, rise time, determines the time required for the leading edge to rise to a second fixed-reference point at 90% of full scale of the transition level. The third measurement, duration, is the period of time which the white signal exists above the 90% fixed-reference point from the leading edge to the trailing edge of the signal. The fourth measurement, fall time, is the time required for the white signal to fall from the 90% level back to the 10% level on the trailing edge. These measurements may be used to help correct for the group delay and system response.

Figure 5:
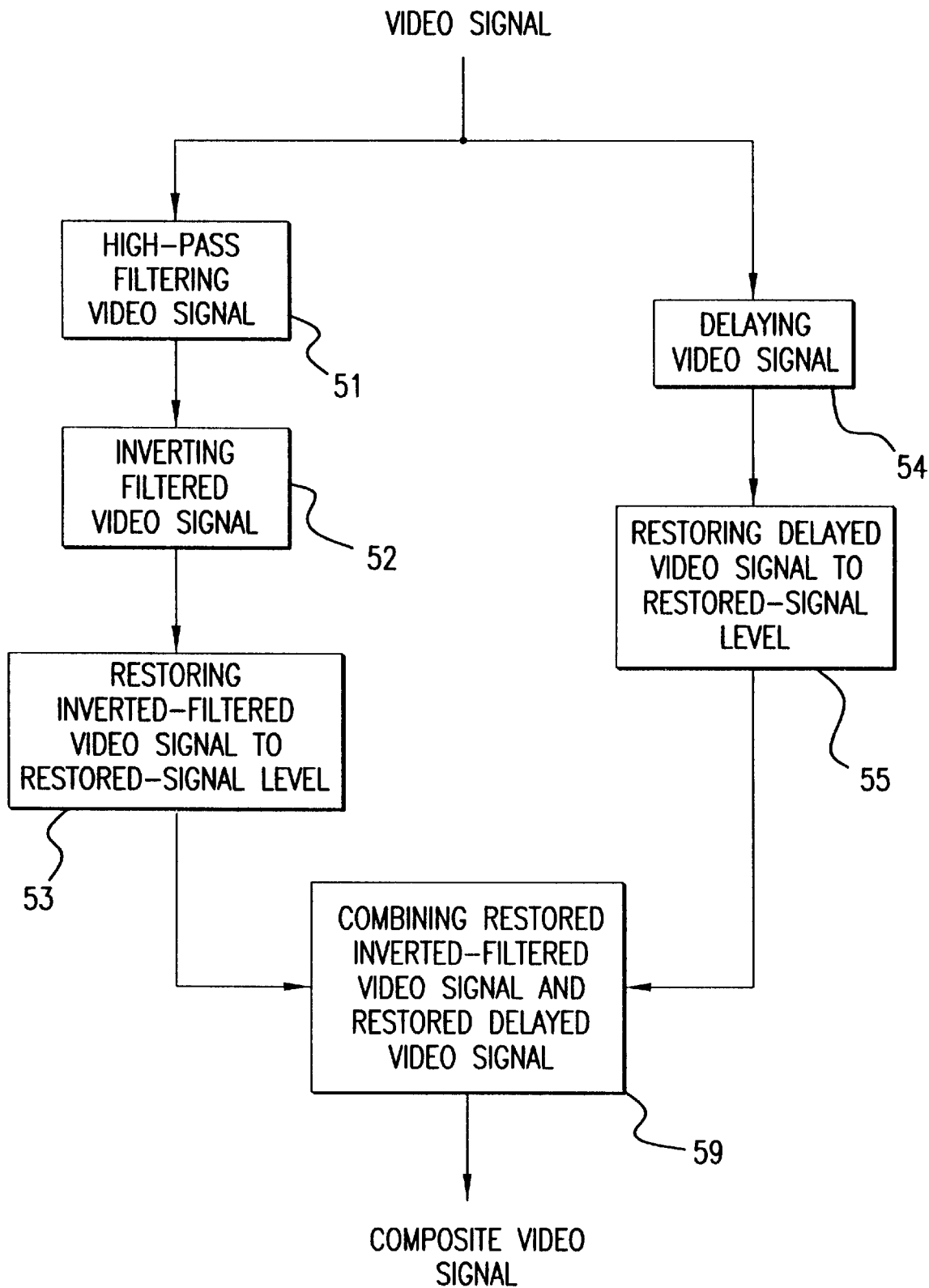
FIG. 5 is a flowchart of the method of the initial-video processor.

The present invention also includes a method, using the initial-video processor, for compensating for accumulated phase-and-gain errors encountered during transmission of the video signal over the transmission channel. The method, as shown in FIG. 5, includes the steps of high-pass filtering 51 the video signal with a bandwidth characteristic inverse to a low-pass characteristic encountered during transmission of the video signal. The steps further include inverting 52 the filtered video signal to generate an inverted-filtered video signal. Also, the video signal is delayed 54 by at least a half-cycle. The delayed video signal and the inverted-filtered video signal are combined 59 to generate a composite video signal.

The method may further include the steps of restoring 53 the inverted-filtered video signal to a restored-signal level, and restoring 55 the delayed video signal to the restored-signal level. The restored inverted-filtered video signal and the restored delayed video signal, which both have a signal level approximately equal to the restored-signal level, are then combined 59 to generate the composite video signal.

The Digital Processor

The digital-processing means reshapes or reprocesses the composite video signal to re-establish PAL, NTSC, SECAM or other world-wide broadcast standard with time-base correction. As illustratively shown in FIG. 6, the digital-processing means may be embodied as a digital processor 75. The digital processor 75 includes the input-video processor 63, the feature-video processor 64, the frame buffer 76, the RGB-output processor 65, the output-video processor 69, the vertical-and-horizontal synchronized-clock doubler 77, and the control processor 72.

The feature-video processor 64 is operatively coupled between the input-video processor 63 and the frame buffer 76. The RGB-output processor 65 is operatively coupled to the output of the frame buffer 76. The output-video processor 69 is operatively coupled to the input-vide processor 63, the feature-video processor 64, the frame buffer 76, the RGB-output processor 65 and the vertical-and-horizontal synchronized-clock doubler 77. The control processor 72 is operatively coupled to the input-video processor 63, the feature-video processor 64, the frame buffer 76, the RGB-output processor 65, the vertical-and-horizontal synchronized-clock doubler 77 and to the output-video processor 69.

The control processor 72 may receive input from a switch input 73 and/or from a computer input 74. The outputs from the RGB-output processor 65 may be filtered to produce red video output 66, green video output 67, and blue video output 68. The RGB-output processor also outputs digital RGB signals to the output-video processor 69 which encodes RGB into an analog composite video signal 70 and an analog component video signal 71. The input-video processor 63 of the digital processor 75 is connected to the output of the initial-video processor 62.

Input-Video Processor

The input-video processor 63 converts analog chrominance, luminance or composite inputs, as well as digital-component inputs, through analog-to-digital converters to generate digital signals. The input-video processor 63 receives the composite video signal output by the initial-video processor and converts the composite video signal to a digital signal to generate digital-component signal information. The input-video processor 63 digitizes the information to feed the video-output stages, whether composite, component, or RGB, in 8-bit code. The code may be generated in 10-bit or 12-bit sequences, or any other format known in the art.

In a preferred embodiment the input-video processor includes a plurality of video-input analog-to-digital converters, a digital decoder, a digital encoder, and a clock generator.

Feature-Video Processor

The feature-video processor 64 receives the digital-component signal-information output from the input-video processor 63 and processes the digital-component signal information for video-information enhancement. The feature-video processor 64 may be used to contour video information, reduce noise in the video information, bandpass-equalize the video information using a plurality of filters, and/or encode 4:2:2, 4:1:1, or 8:4:4 PAL or NTSC standards to generate processed component video information.

Frame Buffer

Video-memory means is embodied as a frame buffer 76. The video memory means could also be embodied as a video random-access memory (RAM), an EEPROM, or any other equivalent memory device or combination of memory devices, as is well known in the art. The frame buffer 76 re-establishes NTSC, PAL, SECAM or other selected broadcast timing standards in the processed component video information to generate time-base corrected digital signal information. The frame buffer 76 is a continuation of the input-video processor with respect to time-base correction.

The frame buffer 76 receives the processed component video information from the feature-video processor 64 and writes the processed component video information into video memory. The video memory includes two field buffers. The processed component video information is written at the standard vertical-scan rate of 59.94 Hz and the standard horizontal-scan rate of 15.734 kHz. A gen-lock generator genlocks to the incoming synchronization signals. Phase-locked loops regenerate new timing signals that drive a sync counter to generate new, harmonically doubled synchronization pulses and delays to the memory-read processor to read the information at twice the incoming rate to the RGB-output processor and then to the output-video processor. The synchronization pulses controlling the read function are doubled by the vertical-and-horizontal synchronized-clock doubler 77.

The buffered, processed component-video information is therefore read out at a vertical-scan rate of 119.88 Hz and at horizontal-scan rate of 31.468 kHz, in an interlaced format, with each field being contiguously read twice, in the proper even-odd (E-O) order in which it is normally read. The doubled vertical-scan rate and the doubled horizontal-scan rate increase the eye's perceived resolution of the image and eliminate flicker, half-line flicker, 15-Hz edge flicker, dot crawl error, and cross modulation error. In addition, only true video information is used, without interpolation or averaging, enabling the flicker-elimination system to fully support field-alternate stereoscopic television, also without flicker.

The 119.88/31,468 Hz digital information is output from the frame buffer 76 to the RGB-output processor 65.

RGB-Output Processor

The RGB-output processor 65 converts the time-base corrected digital information and the 119.88/31,468 Hz digital information to an analog format such as RGB for direct output 66, 67, 68. Through the use of a plurality of video-output filters, the RGB-output processor 65 also generates 119.88/31,468 Hz digital RGB-video output with increased bandwidth to the output-video processor 69.

Output-Video Processor

The primary function of the output-video processor 69 is to reconstruct the digital-video output from the RGB-output processor 65 into an analog-signal format. The output-video processor 69 re-encodes RGB into analog-composite video and/or analog-component video. In a preferred embodiment, the output-video processor 69 includes a digital-to-analog converter, a digital-video encoder, a digital-space converter, an analog-input analog-to-digital converter for genlock, and a clock generator.

The output-video processor converts the doubled 119.88/31,468 Hz digital signals into an analog video-signal format such as composite or component. The output-video processor also produces a synchronization pulse that is fed back into the vertical-and-horizontal synchronized-clock doubler to synchronize the memory-read information for the output-video processor to decode.

The output-video processor 69 also can add chrominance enhancement. For RGB format, for example, a look-up table (LUT) may be used by the output-video processor in place of an analog-to-digital converter. Values in the LUT may be modified by the control processor, directly by the user, or using any other technique. Once these signals are stored, they can be reset in the various processors.

The output-video processor also has a series of analog filters to enhance an edge or roll off an edge and to compensate for distortion caused by broadcast equipment.

Vertical-and-Horizontal Synchronized-Clock Doubler

The vertical-and-horizontal synchronized-clock doubler 77 is used to manipulate the vertical scan-rate and the horizontal scan-rate, effectively doubling the vertical-scan synchronization pulse and the horizontal-scan synchronization pulse generated by the control processor 72 as doubled synchronization pulses. The doubled synchronization pulses are input to the frame buffer and the output-video processor. To complete the loop, a synchronization pulse from the output-video processor is fed back into the vertical-and-horizontal synchronized-clock doubler 77 to synchronize the memory-read information for the output-video processor to decode.

The effect of doubling the horizontal-scan rate and/or the vertical-scan rate is summarized below, with the NTSC color standard provided for comparison.

| Format | V | H | Lines/Field | Fields/Frame | Lines/Frame |
|---|---|---|---|---|---|
| NTSC | 59.94 | 15,734 | 262.5 | 2 | 525 |
| 2H | 59.94 | 31,468 | 525 | 2 | 1050 |
| 2V | 119.88 | 15,734 | 131.25 | 4 | 525 |
| 2H2V | 119.88 | 31,468 | 262.5 | 4 | 1050 |

Where:

V=vertical-scan rate in cycles/second (Hz)

H=horizontal-scan rate in cycles/second (Hz)

2H=line doubled, e.g. double the horizontal-scan rate

2V=field doubled, e.g. double the vertical-scan rate

In line doubling, the vertical-scan rate remains at 59.94 Hz and the horizontal-scan rate is doubled to 31.468 kHz, increasing the number of lines per field from 262.5 to 525, so that what required two scans by NTSC standards is accomplished in one scan in exactly one-half the time. This is defined as scan conversion, as the scan is converted from interlace to progressive since each line in the field is contiguously read, one after the other, from written field to written field. Because reading from a field storer is accomplished at one-half the writing time, the scan is usually repeated twice, although often modifications are made to the information in the second scan.

Doubling the horizontal-scan rate under these conditions removes half-line flicker because doubling the horizontal-scan rate eliminates the half-line at the beginning of the frame and the half-line at the end of the frame, annulling the field-interlace function. Doubling the horizontal-scan rate has no effect on large area flicker and no effect on dot crawl error or cross modulation error.

In field doubling, the vertical-scan rate is doubled to 119.88 Hz and the horizontal-scan rate remains at 15.734 kHz. Half-line flicker and full field flicker are both eliminated because the vertical-scan rate, or field rate, is above 70 Hz.

In accordance with the present invention, doubling the horizontal-scan rate and the vertical-scan rate produces four fields per written frame which are scanned as a video image at a nominal rate of one field every $\frac{1}{120}$ second, well above the rate at which flicker is perceptible to the human eye. Furthermore, all four fields are scanned sequentially so that the persistence of vision in the human visual system creates the impression of all four fields being displayed simultaneously, which also improves brightness. In the prior-art systems using line doubling, half the video information is scanned in a field one/field two/field one/field two sequence, followed by the other half in a field three/field four/field three/field four sequence. The result to the human eye is loss of the retinal memory of the information in fields one and two during the display of fields three and four, creating noncontiguous visual effects which reduce perceivable resolution. The present invention, with its interlaced display of field one/field two/field three/field four, field one/field two/field three/field four, etc., effectively presenting entire frames on the screen, provides significant improvements in resolution, brightness, contrast ratio, and color saturation in the resulting image due to the increased information and temporal proximity of the information presented to the human eye.

To generate the interlace information to achieve this phenomenon, all standard NTSC, PAL, and sync are reduced to one-half of their temporal bases, including blanking, vertical serrate, breezeway, front porch, back porch, as well as horizontal sync. The system can still maintain an interlaced picture with standard composite horizontal and vertical sync without vertical serrate using continuous pulses during vertical blanking. Since multi-sync monitors are not interlace monitors, the desired method for syncing is contiguous vertical sync and separate horizontal contiguous sync. If sync were not used properly, undesirable line pairing occurs. Vertical serrate interlace is accomplished in the phase-locked loop and reconstructed in the sync generator.

The following timings are necessary to a vertical serrate interlace under the present invention:

| | |
|---|---|
| Total line period | 31.778 µs |
| Horizontal blanking rise time | 70 ns |
| Sync rise time | 70 ns |
| Burst envelope rise time | 150 ns |
| Horizontal blanking start to horizontal reference point | 0.75 µs |
| Horizontal sync | 2.35 µs |

Control Processor

The control processor 72 provides control and monitoring functions. The control processor 72 addresses the input-video processor 63, the feature-video processor 64, and the output-video processor 69, and can send messages monitoring the on-line status of these processors. The control processor can embed information in the vertical-blanking interval to send control information to the feature-video processor or to a downlink.

The control processor 72 generates a vertical-scan synchronization pulse and a horizontal-scan synchronization pulse. The vertical-scan synchronization pulse and the horizontal-scan synchronization pulse are sent to the frame buffer 76 to control the write and read functions. The vertical-scan synchronization pulse and the horizontal-scan synchronization pulse pass through the vertical-and-horizontal synchronized-clock doubler 77, where they are doubled as doubled synchronization pulses, and then input to the frame buffer and the output-video processor 69.

The control processor 72 determines the parameters that are used by the input-video processor 63, the feature-video processor 64, and the output-video processor 69, and may update these parameters in response to switch inputs 73 or to external computer inputs 74. The parameters may representatively include burst phase, chroma levels, picture sharpness, noise reduction, and adjustments to the plurality of filters used to bandpass-equalize the video information. The parameters can be checked by looking at the display screen, a vector scope, or other device.

The control processor 72 includes a control-processor memory and an electronically erasable programmable read only memory EEPROM. A set of default parameters is stored in the control-processor memory. The control-processor 72 memory is a hard-coded memory that can only be changed by replacement of the control processor with a new control processor 72 having new default parameters. The EEPROM is used to store a changeable set of the same parameters.

The set of parameters stored in the EEPROM is verified using a warm-start pattern; the warm-start pattern may be stored in the EEPROM or on a disk in a remote computer. At power up or upon reset, the EEPROM warm-start pattern is read. If the pattern were valid, then the parameter set stored in the EEPROM is loaded into the input-video processor 63, the feature-video processor 64, and the output-video processor 69. If the warm-start pattern were not valid, then the parameter set hard-coded into the control-processor memory is used by the input-video processor 63, the feature-video processor 64, and the output-video processor 69. The warm-start pattern, which is set up by the EEPROM, allows the control processor to operate in a stand-alone default mode on power-up when there are no other switch or computer inputs to provide parameter information.

Figure 6:
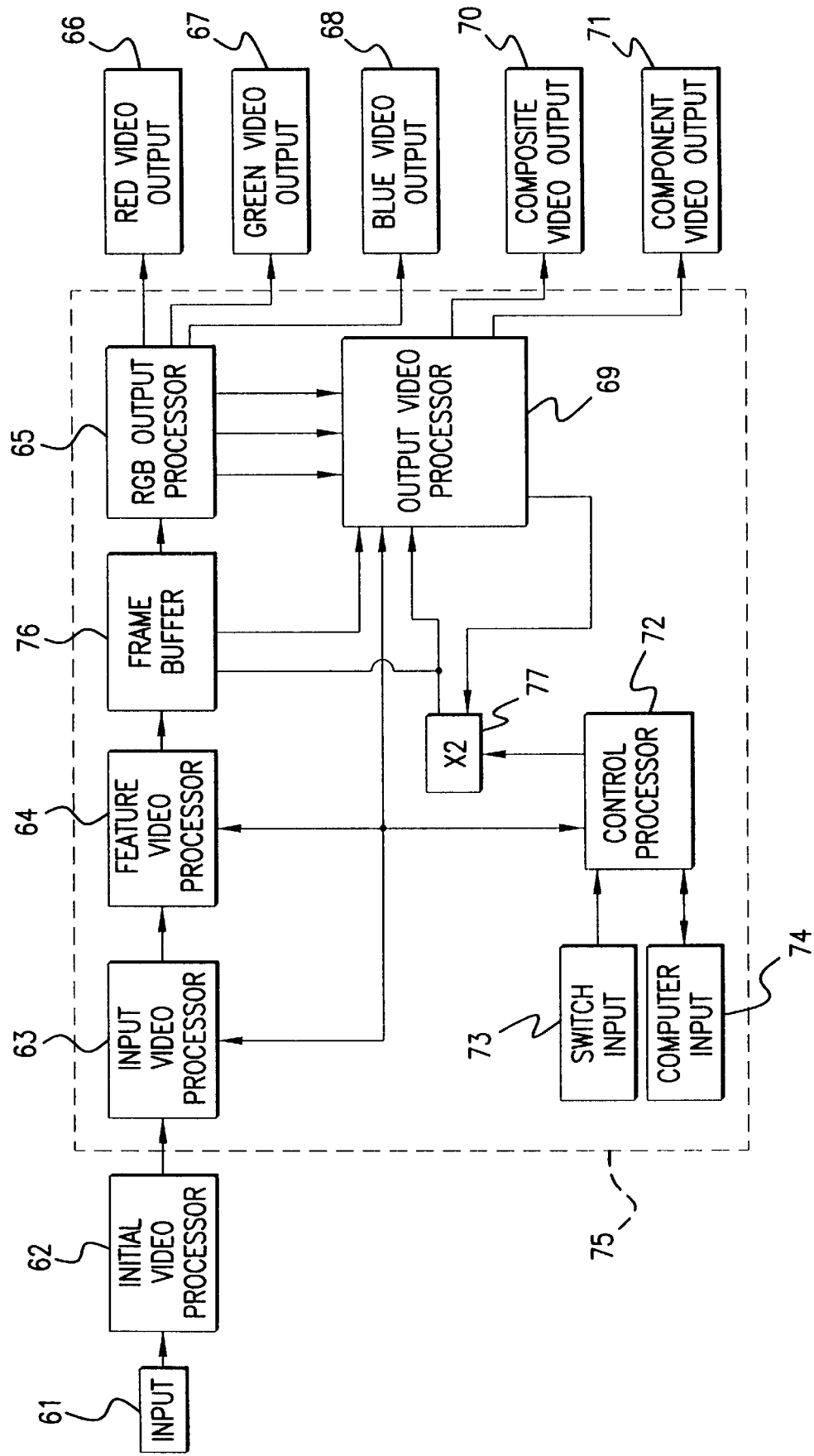
FIG. 6 is a block diagram of the flicker-elimination system of the present invention indicating the input-and-output paths.
Figure 7:
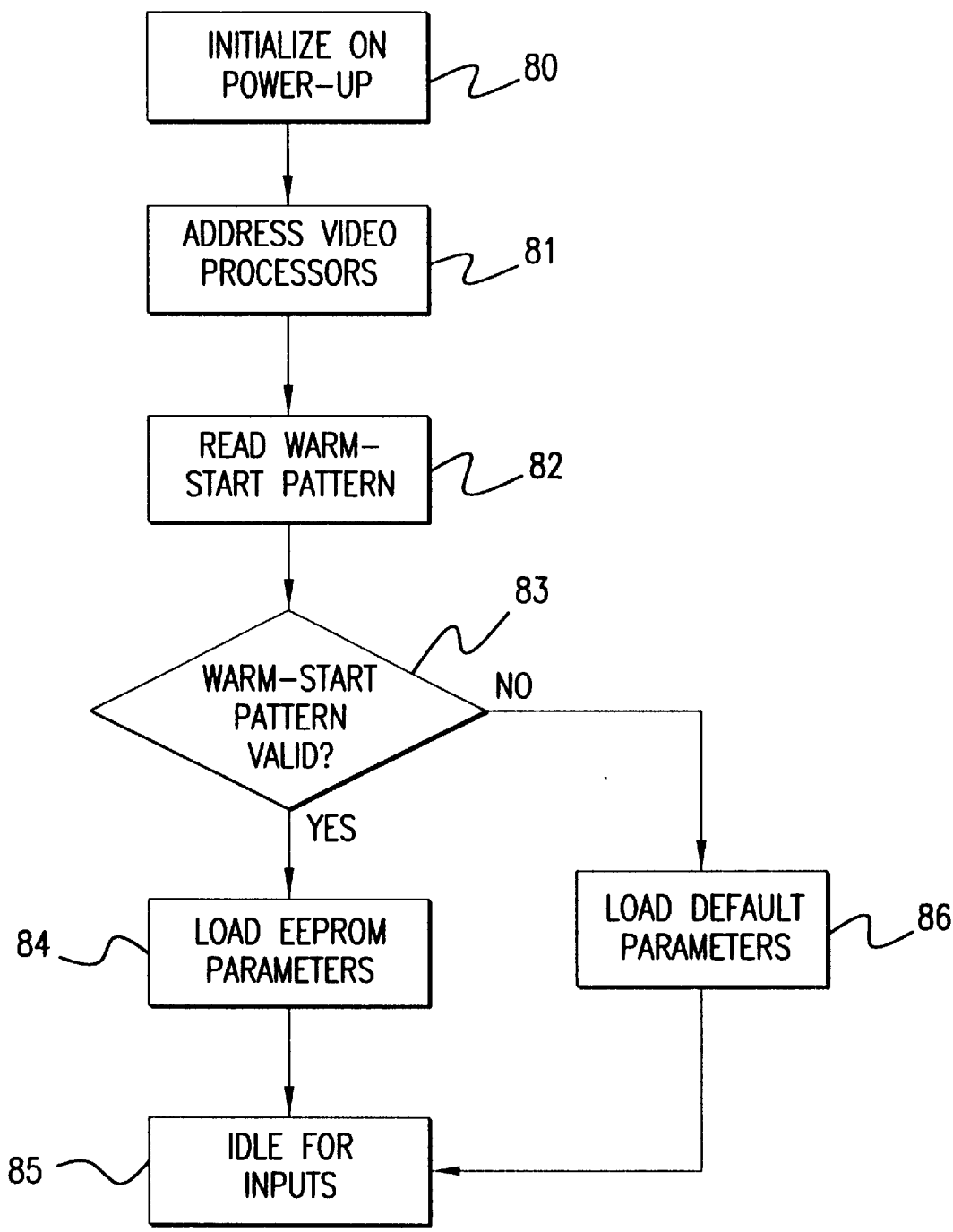
FIG. 7 is a block diagram of the microprocessor-controller software on a power-up initialization.

As shown in FIG. 7, upon power-up or reset the control processor 72 initializes 80 the digital processor. Initialization includes loading the default set of parameters stored in the control-processor memory. If there were no inputs from the digital switch input 73 (FIG.6) or from the computer input 74 (FIG.6), then the control processor 72 addresses 81 the input-video processor 63, the feature-video processor 64, and the output-video processor 69. The control processor 72 then reads 82 the warm-start pattern stored in the EEPROM or stored on disk in a remote computer. If the warm-start pattern were valid 83, then the control processor loads 84 the set of parameters stored in the EEPROM or in the remote computer into the input-video processor 63, the feature-video processor 64, and the output-video processor 69. The control processor 72 then idles 85 for inputs. If the warm-start pattern were not valid 83, then the default parameters are loaded 86 and the control processor 72 idles 85 for inputs.

A warm-start pattern is used to verify the validity of a program or a set of parameters stored in the EEPROM or on a disk in a remote computer. The storage pattern is typically a byte (eight bits) of data. With eight bits, there are 256 possible combinations. A bit pattern of 10100101 is read as 0xA5 or as A5 hexadecimal. The probability of the exact pattern existing in a fixed memory location by accident is at least 1 in 256. Writing a fixed pattern to multiple-byte locations increases the probability by 2 to-the-power-of bit locations. Using four consecutive bytes for a total of 32 bits, or 2 to-the-32nd power, equates to 4,294,967,296 possible combinations.

By writing a known bit pattern to four consecutive bytes in the EEPROM each time the stored parameters are updated, the validity of the parameters may be verified on the next start up. On power up or upon reset, the four bytes of data are read and each byte is compared with a hard-coded pattern. If all four bytes matched, then the stored parameters are valid and are loaded into the input-video processor 63, the feature-video processor 64, and the output-video processor 69. If all four bytes did not match, then the controller processor 72 instructs the input-video processor 63, the feature-video processor 64, and the output-video processor 69 to proceed with the default set of parameters hard-coded in the control-processor memory.

Figure 8:
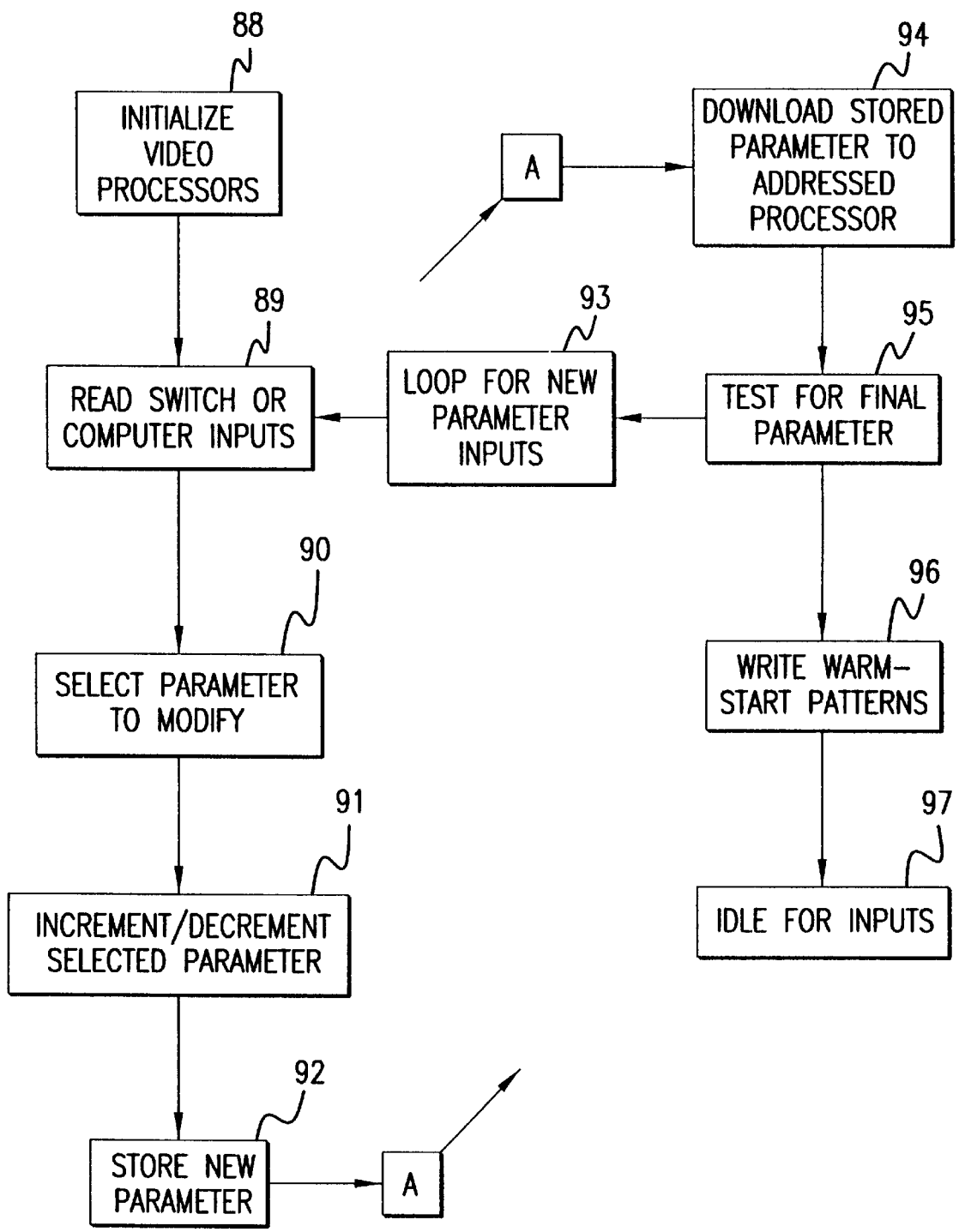
FIG. 8 is a block diagram of the software for modifying the video-processor parameters either in real time through switch inputs or via a software download from an external computer.

The present invention also includes a method for implementing front-panel control adjustments to the parameters. The parameters may representatively include burst phase, chroma levels, picture sharpness, noise reduction, and adjustments to the plurality of filters used to bandpass-equalize the video information. As shown in FIG. 8, when the control processor 72 receives inputs from the switch 73 or the computer 74 (FIG. 6), the control processor 72 initializes 88 the input-video processor 63, the feature-video processor 64, and the output-video processor 69, and then reads 89 the switch or computer inputs. The control processor 72 then selects 90 a parameter to modify and increments or decrements 91 the selected parameter. The new parameter is stored 92 in the EEPROM or the remote computer and then downloaded 94 to the addressed processor. The control processor 72 then tests 95 for final parameters and may loop 93 for new parameter inputs. When the final parameters have been tested, the control processor 72 writes 96 warm-start patterns to the EEPROM or the remote computer, and idles 97 for inputs.

In use, the control processor 72 controls the parameters used by the input-video processor 63, the feature-video processor 64, and the output-video processor 69 in processing the digital-component signal information and re-establishing broadcast standards in the processed component video information. These parameters may have the default values stored in the control-processor memory or may have values input from the switch input 73 and/or the computer input 74. A user may control the switch input 73 and the computer input 74 to modify the parameter values in response to the nature and extent of video distortion as seen on a display screen or other user interface medium. This ability to interactively modify the parameters in response to actual signal-quality degradations enables the user, through the digital processor 75, to generate an improved-output signal better in quality than the video signal as originally transmitted.

Parameter values modified by the user may be stored in the EEPROM or in the external computer. The stored-parameter values may be reused by verification of the warm-start pattern written to the EEPROM or the external computer when the digital processor is used again at a later time.

Through adjustment of the code that controls the input-video processor 63, the feature-video processor 64, and the output-video processor 69, the quality of the video signal corrected by the initial-video processor 62 as a composite video signal may be enhanced. The ability to control the code responsible for driving the input-video processor 63, the feature-video processor 64, and the output-video processor 69 enables the user to interactively improve the composite video signal in a way not possible in the prior art.

The present invention further comprises a method of eliminating flicker using the flicker-elimination system as shown in FIG. 6. The method also eliminates half-line flicker, 15-Hz edge flicker, dot crawl error, cross luminance and cross modulation error. According to the method, a video signal is received through a video input 61 into the initial-video processor 62. The video signal may be distorted and degraded as the result of changes in the waveform occurring during transmission. The initial-video processor 62 normalizes the distorted video signal to correct for chrominance-group delays, luminance-group delays, and differential phase-and-gain incurred during recording and/or transmission of the video signal. Alternatively, the video signal may be received by the input-video processor 63 directly. The initial-video processor 62, if used, normalizes the distorted video signal by high-pass filtering the input video and inverting the filtered video to generate an inverted-filtered video signal. The initial-video processor 62 also delays the input video by a half-cycle, or more, as a delayed video signal. The delayed video signal and the inverted-filtered video signal are combined to generate a composite video signal.

Figure 9:
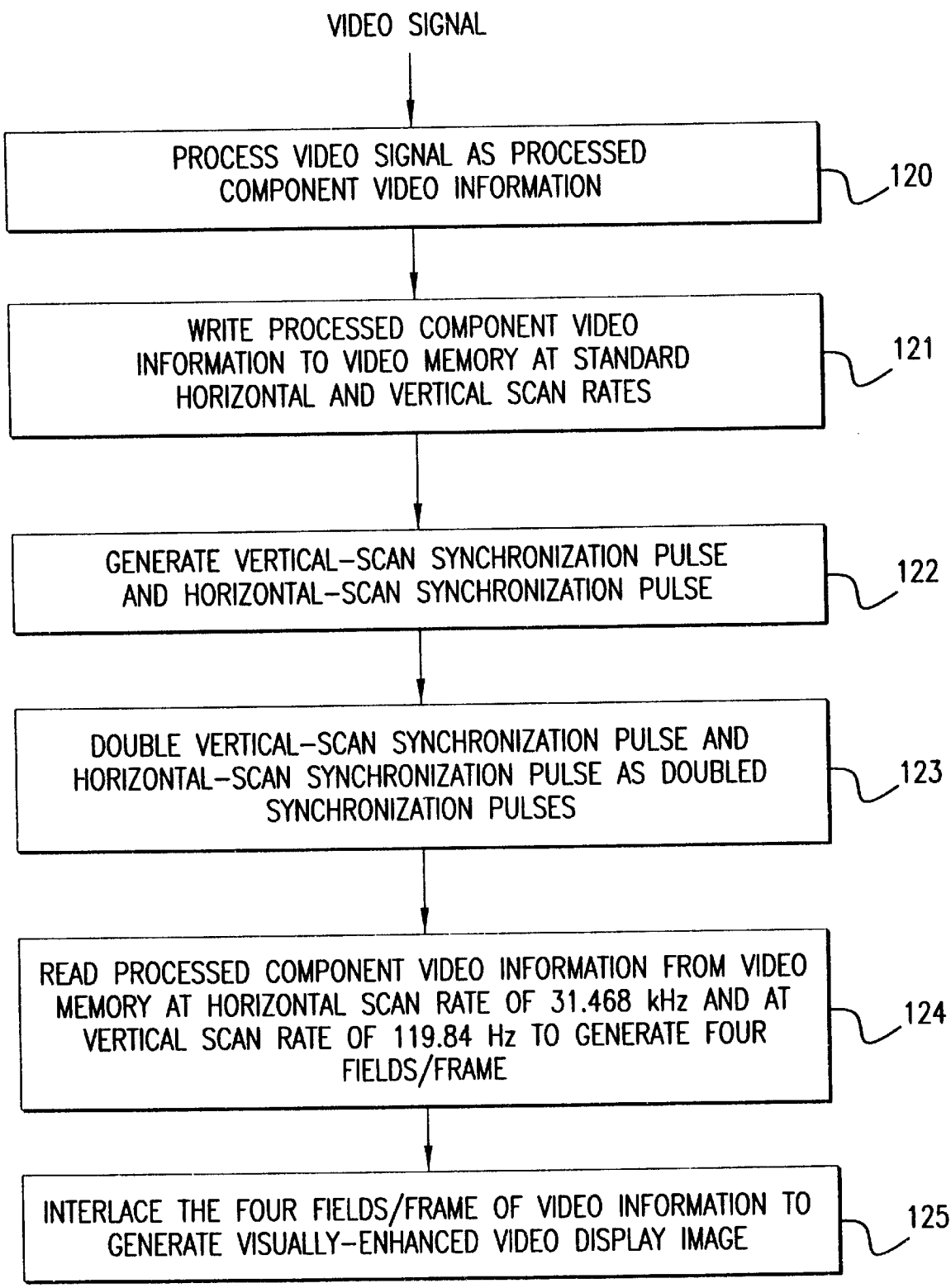
FIG. 9 is a flowchart of the method of the flicker-elimination system.

The composite video signal is input to the input-video processor 63. The method thereafter comprises, as shown in FIG. 9, the steps of processing 120 a video signal as processed component video information and writing 121 the processed component video information to a video memory at a horizontal-scan rate of 15.734 kHz and a vertical-scan rate of 59.94 Hz. The method then comprises the steps of generating 122 a vertical-scan synchronization pulse and a horizontal-scan synchronization pulse, doubling 123 the vertical-scan synchronization pulse and the horizontal-scan synchronization pulse as doubled synchronization pulses, and reading 124 the processed component video information from the video memory, responsive to the doubled synchronization pulses, at a horizontal-scan rate of 31.468 kHz and a vertical-scan rate of 119.88 Hz to generate four fields of video information per frame. The four fields of video information per frame are then interlaced 125 to generate a video display image having enhanced resolution, color saturation, brightness and contrast ratio. These enhancements result from the utilization of all the picture information originally contained in the video signal and the number of repeated pixel scans made possible by the speed of the scanning rates employed.

A flicker reduction system could be attached to the outputs of a standard television camera, the signals processed and output to a recording device, preferably a standard D-5 video recorder for extended resolution, and the flicker-free, artifact-free, wideband signals with improved vertical resolution and improved horizontal resolution could be recorded.

The flicker-free, artifact-free, wideband signals could be down-converted from the recorder through a flicker reduction system to NTSC (or PAL) broadcast standards for post-production work using standard video post-production equipment while retaining improved vertical resolution and improved horizontal resolution. The edited product received from the post-production facility would remain broadcast standard and could then be transmitted by any means of conventional broadcast transmission.

At the receiver, the signal could be up-converted through a flicker reduction system output to a multi-sync display system capable of displaying a 119.88/31,468 Hz image with increased resolution over conventional broadcast transmission with removal of NTSC or PAL artifacts and flickers.

Thus the flicker-reduction system is upward compatible and downward compatible with NTSC and PAL studio and broadcast standards.

It will be apparent to those skilled in the art that various modifications can be made to the flicker-elimination system of the instant invention without departing from the scope or spirit of the invention, and it is intended that the present invention cover modifications and variations of the flicker-elimination system provided they come within the scope of the appended claims and their equivalents.

I claim:

1. A flicker elimination system, having a video input and a video output, for eliminating field flicker perceptible to a human viewer in an interlaced video image system using a digital processor, comprising:

an input-video processor, coupled to said video input, for converting a received composite video signal into digital-component signal information;

a feature-video processor, coupled to said input-video processor, for processing the digital-component signal information as processed component video information;

a frame buffer, coupled to said feature-video processor, for re-establishing broadcast timing standards in the processed component video information to generate time-base corrected digital information;

an RGB-output processor, coupled to said frame buffer, for decoding the time-base corrected digital information to generate analog RGB outputs for direct output and to generate digital RGB-video outputs having increased bandwidth;

an output-video processor, coupled to said RGB-output processor and to said video output, for reconstructing the digital RGB-video outputs into an analog-composite video-signal format and an analog-component video-signal format;

a control processor, coupled to said input-video processor, said feature-video processor, and said output-video processor, for initializing and updating a set of parameters used to process the received composite video signal, and for generating a vertical-scan synchronization pulse for a vertical-scan rate and a horizontal-scan synchronization pulse for a horizontal-scan rate;

a vertical-and-horizontal synchronized-clock doubler, coupled to said control processor, to said frame buffer and to said output-video processor, said vertical-and-horizontal synchronized-clock doubler for harmonically doubling the vertical-scan synchronization pulse received from the control processor and for harmonically doubling the horizontal-scan synchronization pulse received from the control processor to generate harmonically doubled synchronization pulses, and for inputting the harmonically doubled synchronization pulses to said frame buffer and to said output-video processor; and said frame buffer, responsive to the harmonically doubled synchronization pulses, for reading the time-base corrected digital information at a harmonically doubled vertical-scan rate and at a harmonically doubled horizontal-scan rate to produce a visually enhanced interlaced video display image.

2. The flicker-elimination system as set forth in claim 1, further comprising a switch input, coupled to said control processor, for inputting values for the set of parameters, the set of parameters including at least two of burst phase, chroma levels, picture sharpness, noise, and brightness and contrast adjustments.

3. The flicker-elimination system as set forth in claim 1, further comprising an external-computer input, coupled to said control processor, for inputting values for the set of parameters, the set of parameters including at least two of, burst phase, chroma levels, picture sharpness, noise, and brightness and contrast adjustments.

4. The flicker-elimination system as set forth in claim 1, further comprising:
an initial-video processor, coupled between said video input and said input-video processor, for normalizing a distorted video signal as a received composite video signal.

5. A flicker-elimination system for compensating for accumulated phase-and-gain errors incurred during transmission of a video signal over a communications channel and resulting in a distorted video signal, and for eliminating flicker, half-line flicker, edge flicker, dot crawl error, and cross modulation error in an interlaced video image, comprising:
an initial-video processor having a video input and a video output, said initial-video processor including,
a high-pass filter and inverting amplifier, coupled to said input, for filtering and inverting the distorted video signal received at the input as an inverted-filtered video signal;
a postcorrection phase-and-gain restorer, coupled to said high-pass filter and inverting amplifier, for restoring a signal level of the inverted-filtered video signal as a restored inverted-filtered video signal;
a wideband-video delay line, coupled to said input, for delaying the distorted video signal as a delayed video signal;
a precorrection phase-and-gain restorer, coupled to said wideband-video delay line, for restoring the delayed video signal as a restored-delayed video signal; and
a combining network, coupled to said video output, to said postcorrection phase-and-gain restorer, and to said precorrection phase-and-gain restorer, for combining the restored inverted-filtered video signal and the restored-delayed video signal, and outputting a composite video signal to said video output; and
a digital processor, coupled to the output of the initial-video processor, said digital processor including,
an input-video processor, coupled to the output of said initial-video processor, for converting the composite video signal into digital-component signal information;
a feature-video processor, coupled to said input-video processor, for processing the digital-component signal information to generate processed component video information;
a frame buffer, coupled to said feature-video processor, for re-establishing broadcast timing standards in the processed component video information to generate time-base corrected digital information;
an RGB-output processor, coupled to said frame buffer, for decoding the time-base corrected digital information to generate analog RGB outputs for direct output and to generate digital RGB outputs;
an output-video processor, coupled to said RGB-output processor, for reconstructing the digital RGB outputs into an analog-composite video-signal format and an analog-component video-signal format;
a control processor, coupled to said input-video processor, said feature-video processor, and said output-video processor, for initializing and updating a set of parameters used to process the composite video signal, and for generating a vertical-scan synchronization pulse for a vertical-scan rate and a horizontal-scan synchronization pulse for a horizontal-scan rate; and a vertical-and-horizontal synchronized-clock doubler, coupled to said control processor, to said frame buffer and to said output-video processor, said vertical-and-horizontal synchronized-clock doubler for harmonically doubling the vertical-scan synchronization pulse received from the control processor and for harmonically doubling the horizorntal-scan synchronization pulse received from the control processor to generate harmonically doubled synchronization pulses, and for inputting the harmonically doubled synchronization pulses to said frame buffer and to said output-video processor;
said frame buffer, responsive to the harmonically doubled synchronization pulses, reading the time-base corrected digital information at a harmonically doubled vertical-scan rate and at a harmonically doubled horizontal-scan rate to produce a visually enhanced interlaced video display image.

6. The flicker-elimination system as set forth in claim 5, further comprising a switch input, coupled to said control processor, for inputting values for the set of parameters, the set of parameters including at least two of burst phase, chroma levels, picture sharpness, noise, and brightness and contrast adjustments.

7. The flicker-elimination system as set forth in claim 5, further comprising an external-computer input, coupled to said control processor, for inputting values for the set of parameters, the set of parameters including at least two of burst phase, chroma levels, picture sharpness, noise, and brightness and contrast adjustments.

8. A method of eliminating flicker in an interlaced video display image, comprising the steps of:
processing an input video signal as processed component video information;
writing the processed component video information to a video memory at a horizontal-scan rate and a vertical-scan rate;
generating, based on the input video signal, a vertical-scan synchronization pulse and a horizontal-scan synchronization pulse;
harmonically doubling the vertical-scan synchronization pulse and the horizontal-scan synchronization pulse as harmonically doubled synchronization pulses;
reading the processed component video information from the video memory, responsive to the harmonically doubled synchronization pulses, at a harmonically doubled horizontal-scan rate and a harmonically doubled vertical-scan rate reading in an interlaced format, with each frame being contiguously read twice in a proper odd-even order as when normally read at the horizontal-scan rate and the vertical-scan rate, to generate four fields of video information per frame which, because of the proper odd-even order, may be interlaced; and
interlacing the four fields of video information per frame to generate a video display image having enhanced resolution, color saturation, brightness and contrast ratio, the video display image, responsive to the doubled synchronization pulses being derived from the input video signal, being harmonic to any one of NTSC, PAL and SECAM broadcast standards.

9. The method as set forth in claim 8 further comprising the step of:
generating, responsive to the harmonically doubled synchronization pulses, a synchronization pulse for synchronizing the step of reading the processed component video information from the video memory.

10. The flicker elimination system as set forth in claim 1 wherein said interlaced video image system is a field-alternate stereoscopic video image system.

11. The flicker elimination system as set forth in claim 5 wherein said interlaced video image is a field-alternate stereoscopic video image.

12. The method as set forth in claim 8, with the horizontal-scan rate at 15.734 kHz and the vertical-scan rate at 59.94 Hz, and with the doubled horizontal-scan rate at 31.468 kHz and the doubled vertical-scan rate at 119.88 Hz, whereby the video display image is harmonic to the NTSC color broadcast standard.

13. The method as set forth in claim 8, with the horizontal-scan rate at 15.625 kHz and the vertical-scan rate at 50 Hz, and with the doubled horizontal-scan rate at 31.250 kHz and the doubled vertical-scan rate at 100 Hz, whereby the video display image is harmonic to the PAL broadcast standard.

14. The flicker elimination system as set forth in claim 1, with the horizontal-scan rate at 15.734 kHz and the vertical-scan rate at 59.94 Hz, and with the doubled horizontal-scan rate at 31.468 kHz and the doubled vertical-scan rate at 119.88 Hz, whereby the video display image is harmonic to the NTSC color broadcast standard.

15. The flicker elimination system as set forth in claim 1, with the horizontal-scan rate at 15.625 kHz and the vertical-scan rate at 50 Hz, and with the doubled horizontal-scan rate at 31.250 kHz and the doubled vertical-scan rate at 100 Hz, whereby the video display image is harmonic to the PAL broadcast standard.

16. The flicker elimination system as set forth in claim 5, with the horizontal-scan rate at 15.734 kHz and the vertical-scan rate at 59.94 Hz, and with the doubled horizontal-scan rate at 31.468 kHz and the doubled vertical-scan rate at 119.88 Hz, whereby the video display image is harmonic to the NTSC color broadcast standard.

17. The flicker elimination system as set forth in claim 5, with the horizontal-scan rate at 15.625 kHz and the vertical-scan rate at 50 Hz, and with the doubled horizontal-scan rate at 31.250 kHz and the doubled vertical-scan rate at 100 Hz, whereby the video display image is harmonic to the PAL broadcast standard.

* * * * *